United States Patent [19]

Vöhringer

[11] Patent Number: 4,504,292

[45] Date of Patent: Mar. 12, 1985

[54] POWDER SPRAY BOOTH

[75] Inventor: Gerhard F. Vöhringer, Friedrichshafen, Fed. Rep. of Germany

[73] Assignee: ESB Elektrostatische Sprüh- und Beschichtungsanlagen G.F. Vöhringer GmbH, Meersburg, Fed. Rep. of Germany

[21] Appl. No.: 520,195

[22] Filed: Aug. 4, 1983

[30] Foreign Application Priority Data

Aug. 10, 1982 [DE] Fed. Rep. of Germany ....... 3229756

[51] Int. Cl.$^3$ ........................ B01D 46/48; B05C 15/00

[52] U.S. Cl. ........................................ 55/325; 55/337; 55/348; 55/432; 55/DIG. 46; 98/115; 118/DIG. 7

[58] Field of Search ................. 55/321, 325, 337, 348, 55/432, DIG. 46; 98/115 SB; 118/326, 634, DIG. 7

[56] References Cited

U.S. PATENT DOCUMENTS

| | | | |
|---|---|---|---|
| 940,076 | 11/1909 | Seaver | 55/337 X |
| 3,618,302 | 11/1971 | Cornett | 55/278 |
| 3,801,869 | 4/1974 | Masuda | 98/115 SB X |
| 3,902,455 | 9/1975 | Lehmann et al. | 98/115 SB X |
| 4,224,043 | 9/1980 | Dupre | 55/432 X |
| 4,260,400 | 4/1981 | Scalet | 55/432 X |
| 4,277,260 | 7/1981 | Browning | 98/115 SB X |
| 4,303,417 | 12/1981 | Koch | 118/326 X |
| 4,354,451 | 10/1982 | Vohringer et al. | 98/115 SB X |
| 4,375,487 | 3/1983 | Huber | 98/115 SB X |
| 4,378,728 | 4/1983 | Berkmann | 98/115 SB |
| 4,401,445 | 8/1983 | Browning | 98/115 SB X |

FOREIGN PATENT DOCUMENTS

| | | | |
|---|---|---|---|
| 1753411 | 7/1957 | Fed. Rep. of Germany . | |
| 2839540 | 3/1980 | Fed. Rep. of Germany . | |
| 1226122 | 7/1960 | France . | |
| 737457 | 9/1955 | United Kingdom | 55/337 |
| 1014934 | 12/1965 | United Kingdom . | |

*Primary Examiner*—Robert Spitzer

*Attorney, Agent, or Firm*—Holman & Stern

[57] ABSTRACT

A powder spray booth wherein the workpieces are moved through a coating space and coated by powder coming from an electrostatic spray gun at a spray opening. An aspiration blower is used for forcing the air coming in through the spray opening through a cyclone unit with a battery of cyclone separators and through a filter unit with a filter bag. The air is moved upwards along upwards sloping lines of flow to the aspiration duct, and the powder is moved downwardly under the effect of gravity. Only a part of the powder reaches the cyclone separators and is removed from them through airlocks. The part of the powder not separated in this way deposits in the filter space, a part of it only after cleaning the filter. This part of the powder is removed on opening an outlet door and is taken up on the screen of the powder car and then mixed with the powder from the cyclone separators or, by opening the outlet door, run into a space, where a second powder car may be placed. By designing the cyclone units as part of the booth or booths the overall structure is made simpler and the time needed for cleaning down on changing the color of the powder is decreased.

15 Claims, 5 Drawing Figures

POWDER SPRAY BOOTH

BACKGROUND OF THE INVENTION

1. Field of the Invention

The present invention relates to a powder spray booth with a unit for separating or recovery of unused spray powder from the propellant gas, with an outlet opening at an outlet side of the spray booth and through which the propellant gas is aspirated with the rest of the powder, that is to say powder that has not been deposited on the workpiece to be coated, to a number of cyclone separators that are integrated as parts of the spray booth.

2. Description of the Prior Art

In addition to the recovery of powder from the spent air coming from a booth by using different types of filter plant, cyclone separators have been used for this purpose, such cyclones being normally so run that the propellant air, still having some powder therein, is supplied in a downward direction while turning and then aspirated off again in an upward direction centrally so that, once in the cyclone, a large part of the powder still in the air becomes deposited on the floor of the cyclone, from which position it may be removed and put to good use. Cyclone separators may be thought of as having the edge over filter units inasfar as hardly any powder is deposited in the inside of the cyclone housing, this making cleaning more straightforward. On the other hand there is the undesired effect that the degree of separation is decreased, more specially when it comes to processing fine-grain powder: in fact in the case of powder with a particle size of 10 microns about 95% is recovered, or in other words there is a loss of only 5%, but however with powder grain sizes of less than 10 microns the recovery rate is only 60%. This being the case, recovery of coarse powders will be economically rewarding only using cyclones, whereas for finer sorts of powder a filter is needed after separation in the cyclone before further powder may be recovered and used.

In one earlier suggestion (see the German Offenlegungsschrift No. 2,839,540) a battery of cyclone separators was to be permanently joined up with a powder spray booth so that on the aspiration side there was a direct connection with the booth outlet. However the outlet through the booth floor was placed next to the aspiration point so that the powder sprayed generally on the level into the booth was pulled downwards by the aspiration effect and the trajectory of the powder was made shorter and the degree of deposit on the work became poorer, whereas on the other hand the amount of powder getting to the cyclone separators became overly great.

BRIEF SUMMARY OF THE PRESENT INVENTION

It is for these reasons that one purpose of the present invention is that of making such a further development of a powder spray booth of the type noted that while giving a more even coating effect the degree of powder deposit on the workpiece is increased, and on the other hand the amount of powder reaching the cyclone separator or separators is reduced.

For effecting these and further purposes or objects, in the invention the booth outlet takes the form a level cross-slot placed opposite to the spray inlet opening of the booth at a point near the top wall of the said booth, there being at least one aspiration duct running from the said slot to the cyclone separators.

Even if only two small cyclone separators are joined up with the booth, the effect is such that the aspiration current making its way from the inlet opening right across the width of the coating space is evened out, the current then moving generally upwards to the top cross-slot and outlet. For this reason the powder is kept moving along a longer trajectory so that the deposit efficiency is stepped up. Then the propellant gas makes its way for the full breadth of the coating space upwards generally like a wedge through the top cross-slot into the aspiration duct. In this respect as well there is a separating effect like the effect of a cyclone because of the force of gravity acting against the lifting force of the propellant gas. The greater part of the powder will for this reason be moved less in an upward direction and more on the level. Most of the powder particles will be moved downwards to an ever increasing degree against the effect of the upwardly moving current of propellant gas and will get as far as the back wall of the coating space if they are not deposited on the floor thereof before this is possible. Because for this reason the amount of spray powder still in the gas by the time it has moved as far as the cyclones is greatly decreased, and it is only such powder that has to be recovered by the cyclone with its less efficient recovery rate, the proportion of the powder which is in effect recovered will go up in comparison with the prior art.

Preferably the cyclone separators with the same height are placed in a battery one after the other along at least the greater part of the outlet side of the booth, this being a relatively simple way of evening out the current through the booth.

The aspiration duct then formed over the cyclone separators may then be joined right up with the cross-slot. It may have the same depth and be shut off to the back by a flat wall, if the separate cyclones are placed right up next to each other. If however a space is kept therebetween, the cross section of the aspiration duct may be changed along its length so as to make room for other ducts or openings.

A useful effect is produced if the cyclone separators are placed over the floor of the booth so that there is a vertical distance therebetween and so that powder which was still in the gas and is deposited on the booth floor and spray powder recovered in the cyclone may be moved into the very same collecting space. Furthermore, but for the inlet and the outlet opening, it is possible to have a common, smooth and for this reason readily cleaned, casing screening off the cyclone separators as far as the coating space.

The air lock placed at the lower end of a cyclone separator is characterized in keeping with the present invention by stopper or door elements that are placed one after the other in the direction of flow and are able to be moved between an open and a shut position. Such shutter or door elements may have a relatively large area and are moved in a direction generally normal to the part of the opening that is still to be shut. For this reason the powder particles still in the opening or gap are only acted upon by a compressive force and not by a shearing or smearing force as is the case with air locks having cells. Furthermore the force acting thereon may be changed as desired without there being any danger of leaks even in cases in which the cross sections to be sealed off are large.

In keeping with a further suggestion forming part of the present invention the two shutter or door elements are placed at one end of a double lever rocking about a level axis, whose other end is acted upon by an actuator that is worked from time to time by a timing means as desired regularly. More specially, the two door elements are able to be moved in relation to each other yieldingly. Such a design with the said double lever is not only simple in structure but is furthermore very trouble-free in operation.

If the gas from the cyclone separators is made to go through a filter unit for the purpose of increasing the powder recovery rate, the filter unit may be placed on the outside of the cyclone separators right in the spray booth, and may more specially be integrated therewith. In this respect it is relatively simple to have guiding or transporting means for running together the amounts of powder coming from the cyclone separators and the filter unit.

In this respect it is more specially preferred to have a switch unit for running together or, as may be desired, keeping separate the amounts of powder recovered by the cyclones and the filter units. And to this end there is provided a take-up space, placed under the filter unit, for recovered unused powder (powder that has not been used up in the coating operation) such that the space may be joined up with a separate collecting space by a first switch element and joined up with a common powder collecting space by a second switch element. In this respect the two switch elements may be so joined up together with one of them only may be opened when the other is shut and so that the two switch elements, that are more specially ganged, may only be worked in turn in the opposite direction.

In this connection there is provided a sloping floor placed under the filter unit downstream of the cyclone, said floor sloping towards a common parting wall towards the cyclones and having right next to the said parting wall a first outlet door opening into a separate collecting space, whereas there is second outlet door, placed right next to the sloping floor in the parting wall, opening into the common collecting space. It is preferred that the first outlet door be hinged at its lower end or edge and the second to hinged at its upper edge.

BRIEF SUMMARY OF THE INVENTION

Further useful effects and details of the present invention will be seen from the detailed description given below with reference to the accompanying drawings wherein.

DETAILED DESCRIPTION

Figure 1:
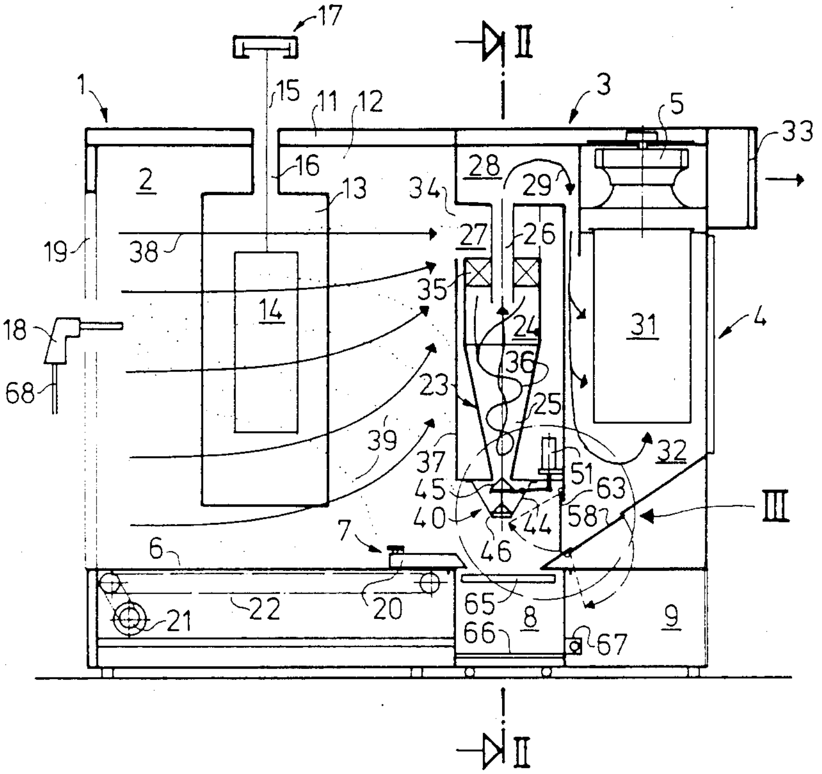
FIG. 1 is a schematic cross-sectional view through a powder spray booth in accordance with the present invention.

As will be seen from the figures herein a powder spray coating booth 1 has a coating space 2 within it, that is joined up with two powder recovery units, that is to say a cyclone unit 3 and a filter unit 4, that are both run by an aspiration blower 5. A scraper unit 7 running along the floor of the booth is used for transporting material into a powder car 8, that may be wheeled through the space 9 from outside.

There are through openings 13 in the top wall 11 of the booth and in the two end walls 12 of the coating space for workpieces 14 to be coated, such workpieces being supported by hangers 15 which are joined up with a closed loop conveyor 17 and running through a slot 16 in the top wall of the booth. These openings may be joined up with tunnel sections if desired. The workpieces are moved automatically by the conveyor 17 at an even speed through the coating space 2.

Using one or more powder spray guns 18 the spray powder for coating the workpieces 14 is sprayed in through the spray inlet opening 19, the powder then being pulled towards the workpiece 14 in question by electrostatic attraction forces. A part of the powder particles that do not become part of the coating on the work is dropped down directly onto the floor 6 of the booth and will be moved by the scraper unit 7 to the powder car 8. This scraper unit has a u-like scraper blade 20, that is moved backwards and forwards by a chain 22, driven by a motor 21, over the booth floor and on being moved to the left (in the sense of FIG. 1, that is) is lifted clear of the floor.

Figure 2:
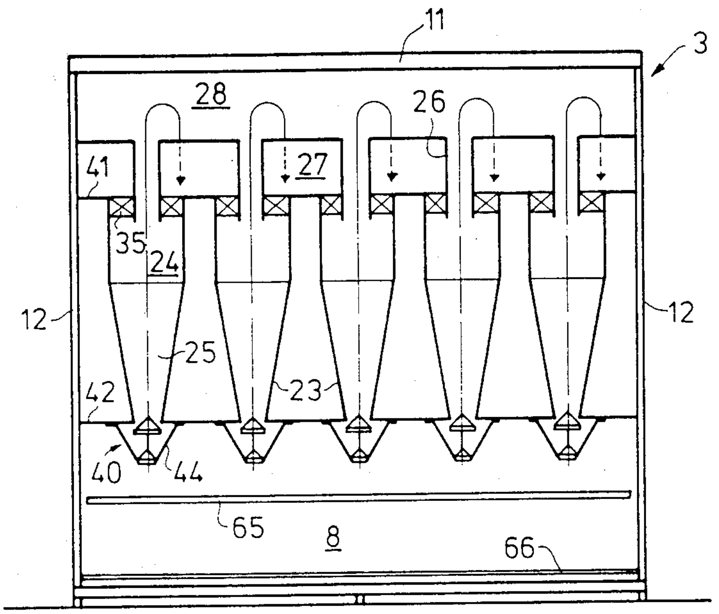
FIG. 2 is a cross-sectional view taken along the line II—II of FIG. 1.

As will be seen for example from FIG. 2, the cyclone unit 3 has five separate cyclone separators 23, that is to say five sheet metal containers place in an upright battery in a known way, each having a top cylindrical part 24 and a lower funnel part 25 becoming narrower in a downward direction at an acute angle. It will be seen that there is a pipe 26 running upwards from the middle of the cylindrical part in an upward direction through an aspirating cross-pipe or duct 27 opening into a connection space 28, see FIG. 1, thereover, from which the air is aspirated as marked by arrows 29 into the filter space 32 with the filter or bag 31 of the filter unit 4 therein, the air then making its way through the filter under the aspirating effect of the aspirating blower 5 and then through filtering cloth 33 into the outside air.

The aspiration duct 27 that is common to all the cyclone separators 23 is placed right under the top wall 11 of the booth and is directly joined up with the coating space 2 by way of a cross-slot 34 that may be covered over by a plate with holes therein. Between the top wall of the cylinder part 24 and the pipe 26 there are normal guide blades 35, the same causing a turning or twisting motion of the said air as aspirated in a downward direction in keeping with the flow lines 36, before such direction of flow has been turned round towards the top pipe 26. Since the powder particles are not able to take part in this change in direction because of their large mass, they are separated out downwardly, the same then dropping mainly out of the cone-like part 25.

All the cyclone separators 23 are walled off from the coating space 2 by a common flat casing wall 37. The air aspirated by the aspiration blower 5 makes its way with a more or less even distribution as marked by the full lines 38 at least generally on the level through the spray opening 19. In this respect the fact that further amounts of air may make their way through the openings 13 and the slot 16 in the top wall into the booth dependent on the way it is placed and joined up does not have to be described for an understanding of the present invention. For the motion of the powder at the workpiece these further amounts of air are generally unimportant. One may in fact assume that the powder sprayed by the powder spray gun is mostly transported on the level by the aspirated air as far as the workpiece 14 so that a more or less even coating is produced. To the back of the workpiece there is then for the time being no further electrostatic control of the motion of the powder. Although the aspirated air is now the most important transporting vehicle or propellant and although aspiration takes place through the upper cross-slot 34 into the aspiration duct 27, the trajectories 39 of the powder grains are made flatter, that is to say they are lifted somewhat, by far the greater part of the powder will come up against the casing wall before dropping downwards down onto the floor.

It is only a very small amount of the overall amount of powder that gets as far as the cyclone separators; any powder not deposited therein will be filtered out by the filter 31, that may be in the form of a bag filter with a large filtering area and with an apparatus for cleaning it.

Figure 3:
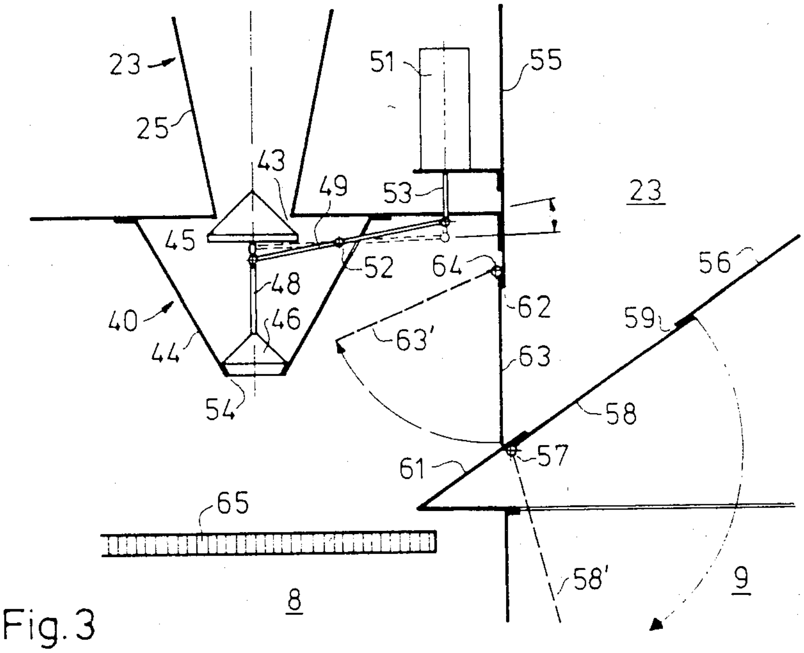
FIG. 3 is an enlarged view of the part, marked III in FIG. 1.

The top and lower ends of the separate cyclone separators are fixed in common parting walls 41 and 42 (see more specially FIG. 2). At the lower parting wall 42 there are air locks 40. Under each outlet opening 43 of the cone part 25 there is a frusto-conical funnel 44 fixed in place by a flange so that it may be taken off, the lower end thereof forming a second outlet opening 54. The two outlet openings have cone-like valve members 45 and 46 that are ganged together by a common support rod 48, which is connected on one end of a lever 49, whose other end is acted upon by an actuator 51 such as a compressed air cylinder actuator or the like. This lever 49 is sealed off where it goes through the wall of the air lock and is pivotally supported on a pin 52 fixed to the housing. At least one of said valve members 45 and 46 may furthermore be moved to a limited degree on and in the direction of the rod 48 against a force. This makes certain that, on lifting the support rod 48, firstly for example the valve member 45 is placed sealingly in the first outlet opening 43 before the second valve member 46 is moved clear of the second outlet opening 54. In this way one may be certain that the space inside the cyclone is kept sealed off all the time. The amount of powder that will have collected at the floor of the cone-like part 25 when powder is being taken out, will be run into the funnel 44 or hopper at once when the parts are moved back into the working position to be seen in the figure. The filter space 32 of the filter unit 4 is shut off from the cyclone unit 3 by a back wall 55 (see FIG. 3) common to all cyclone separators and it is shut off at the bottom from the space 9 by a sloping floor 56. At the edge of same next to the back wall 55 there is a level turnpin 57 or hinge shaft on which a first door 58 is supported, said door being viewed (in FIG. 3) in a shut position thereof over a first outlet opening 59 in the sloping floor 56 and further being viewed (as marked in broken lines) in the opened position 58' in which powder running downwards from the sloping floor 56 is guided into the space 9 in which if desired a further powder box or car 8 may be placed.

Furthermore at a higher level than the turnpin 57 and a bridging plate 61, lined up with the sloping floor 56, there is a second outlet opening 62 through the lower end of the back wall 55, such opening being shut off by a second door 63, whose shut position is marked in full lines and which may be rocked about the hinge or turnpin 64 at its top edge into the opened position 63' marked in broken lines. The two doors 58 and 63 may furthermore be ganged in such a way, for example, that they may only be opened one at a time or in other words, at all times one of them will be shut.

Once the outlet door 63 has been opened, the powder in the cyclone unit and in the filter unit will be moved into the powder box or car 8, where it will be processed in one go by a screen or sifter 65 and then fluidized or loosened by air forced through a perforated lower wall 66 before being supplied directly by an injector 67 and a hose 68 to the powder spray gun 18. If however the outlet door 58 is opened, the powder recovered by the filter unit 4 by cleaning the filter 31 will be supplied through the outlet opening 59 to a another powder car 8 (not figured) that will have been placed in the space 9.

If coarse powder is used for coating, such powder making a very high rate of recovery possible, it may then be possible in some cases to do completely without the filter unit 4. It would then be possible in fact for the aspiration blower 5 to be placed right in the space 28 over the cyclones. If however a filter unit 4 is to be used, working without a filter 31 (filter bag) may in some cases be possible.

Be this as it may however, such a filter 31 will be needed when fine powder is being sprayed, the cyclone recovery rate then being as low as 60 to 80%. In such a case one has to have the filter downstream from the cyclone; more specially the powder may then be separated into coarse and fine powder. Furthermore powder booths with cyclone separators will as a rule be used when it comes to coating with coarse powders, because cleaning is then simpler. In comparison cleaning the inside of the filter unit 4 is very much more complex. This being the case, the amounts of powder filtered out thereby may be given up as wasted and the plant then used for such different colors of powder that the effect of the wasted powdered not able to be recovered is masked; whereas in the cyclone unit 3 it is only the smooth surface outside the cyclone housing that is cleaned. If this way of working is used through and through, it will then be possible for more than one cyclone booth to be joined up with a separate filter unit. Generally speaking there will at any rate be a great decrease in the size of the surfaces to be cleaned, if the cyclone separators are placed in the powder spray booths, that in other respects are shut off from the outside.

Figure 4:
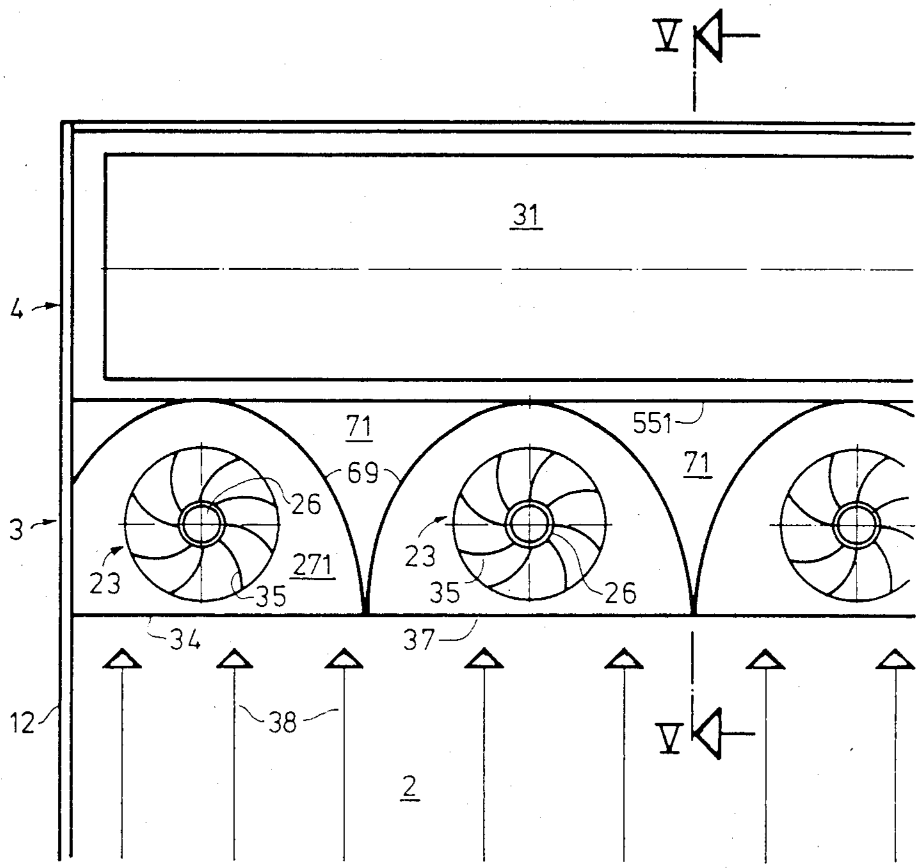
FIG. 4 is an enlarged part cross-sectional view of a different embodiment of booth design taken on the line IV—IV of FIG. 5.
Figure 5:
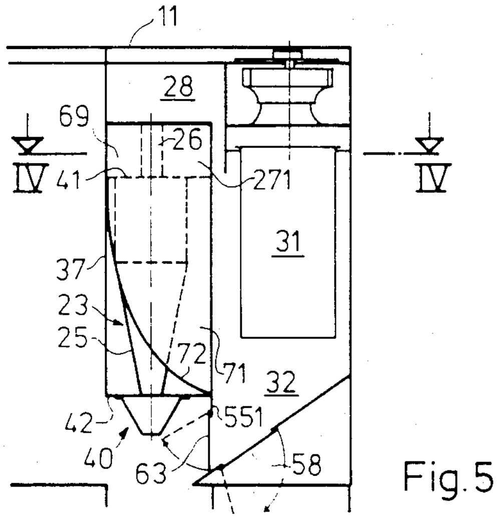
FIG. 5 is a part cross-sectional view taken on the line V—V of FIG. 4.

The small cyclone separators used in the present case are very simply manufactured, but even so there may be some interest in decreasing the number of cyclones used. In fact in the plant to be seen in FIG. 4 the spacing between the cyclone separators 23 is nearly twice as great and aspiration space 271 has been walled off into smaller spaces by sheet metal shrouds or guides 69 placed round the cyclones and the pipes 26, such guides running together like a wedge or knife edge into the flow as marked by the flow lines 38. The walling off into such smaller spaces is such that there is an even incidence of the flow whatever the form of the guide walls, that is to say equally curved on the two sides thereof or in the form of a spiral in keeping with the vortex. It is in this way that generally the same incidence of the flow may be produced using a smaller number of cyclones.

Because furthermore there are spaces 71 between the sheet metal guides 69, such inbetween spaces may be used for supplying the aspirated air from the upper space 28 into the filter space 32. To this end it will only be necessary for the inbetween spaces 71 to be shut off at the lower end by a lower sheet metal guide 72, that is best curved in form. The only part of the flat back wall 55 of FIG. 3 will then be a narrow flat back strip 551, and the filter 31 may then be moved nearer to it.

Because normally no cleaning of the filter space will be necessary, the cleaning operation on only one side, facing the coating space 2, will be somewhat harder to undertake because of the form of the sheet metal guides 69. However in comparison with the design of FIGS. 1 to 3 this is hardly of any weight because in that case the free standing pipes 26 have to be cleaned.

I claim:

1. A powder spray booth for spraying a workpiece with powder particles comprising:

a top wall, a bottom wall and side walls forming a spray coating space in which the workpiece is disposed;

a spray inlet opening through a side wall;

means to spray powder particles with a propellant gas through said spray inlet opening directed at the workpiece;

an outlet opening in a side wall of said booth opposite said spray inlet opening in the form of a slot extending across said side wall near said top wall;

a plurality of cyclone separators integral with said booth for producing aspiration of propellant gas with unused powder therein through said outlet opening;

aspiration inlet openings for said separators; and at least one aspiration duct connecting said outlet opening with said aspiration inlet openings;

so that said propellant gas flows substantially level over the workpiece and then substantially upwardly through said slot opening and said separation inlet openings.

2. The powder spray booth as claimed in claim 1 wherein said cyclone separators are positioned on the same level in a row extending over the greater part of said side wall having said slot opening therein.

3. The powder spray booth as claimed in claim 1 wherein said aspiration duct is positioned above said separators and is directly joined to said slot opening.

4. The powder spray booth as claimed in claim 1 and further comprising:

means forming a spray powder collecting space; and wherein said cyclone separators are positioned a substantially vertical distance above said bottom wall of said booth in such a way that unused powder deposited on said bottom wall and spray powder recovered in said cyclone separators may be supplied to said collecting space.

5. The powder spray booth as claimed in claim 1 and further comprising:

a smooth-surfaced casing covering over said cyclone separators and having inlet and outlet openings communicating with said spray coating space.

6. A powder spray booth as claimed in claim 1 and further comprising:

an airlock at a lower end of at least one of said cyclone separators having an inlet and an outlet;

closure elements in series with each other operatively mounted in said air lock inlet and outlet; and a motor-powered support operatively connected to said closure elements to move said closure elements between open and closed positions so that when one closure element is open, the other is closed.

7. A powder spray booth as claimed in claim 6 wherein said motor-powered support comprises:

a lever pivotably mounted on at least one wall of said booth;

means for operatively connecting one end of said lever jointly with both closure elements;

an actuator operatively connected to the other end of said lever; and a timing means for operating said actuator to pivot said lever at predetermined intervals.

8. The powder spray booth as claimed in claim 6 and further comprising:

a filter unit placed flow-wise downstream from said cyclone separators on an outer side thereof directly adjacent to said spray booth.

9. A powder spray booth as claimed in claim 1 and further comprising:

a filter unit mounted downstream from said cyclone separators and on an outer side of said separators directly on said spray booth, and guiding and supplying means for running together amounts of powder separated by the cyclone separators and the filter unit.

10. The powder spray booth as claimed in claim 9 and further comprising:

a switching means for making a selection between running together and separate running off of amounts of powder recovered by said cyclone separators and said filter unit.

11. The powder spray booth as claimed in claim 10 and further comprising:

means walling in a collecting space for recovered powder positioned under said filter unit, a first switch element and a second switch element, said first and second switch elements being operatively mounted to connect said collecting space with a further separate collecting space or with a common collecting space as desired.

12. The powder spray booth as claimed in claim 11 and further comprising:

means ganging together said two switch elements for setting one thereof in an open position and the other in a shut position and vice versa.

13. The powder spray booth as claimed in claim 11 wherein said two switch elements are operable to produce opposite effects at the same time.

14. The powder spray booth as claimed in claim 10 and further comprising:

a sloping floor placed under said filter unit, said sloping floor running downwards towards said cyclone separators, a common parting wall between said cyclone separators and filter unit at a point uphill from said separators on said sloping floor, a first outlet door in said sloping floor adjacent to said parting wall, and a second outlet door in said parting wall adjacent to said sloping floor opening into said common collecting space.

15. The powder spray booth as claimed in claim 14 wherein:

said first door is pivotably mounted by a hinge means at a lower edge thereof and said second door is pivotably mounted by a hinge means at a top edge thereof.

* * * * *